United States Patent
He et al.

(10) Patent No.: US 12,405,210 B1
(45) Date of Patent: *Sep. 2, 2025

(54) SYSTEM FOR, AND CALIBRATION AND TESTING OF DIRECTED BEAM ELLIPSOMETER SYSTEMS

(71) Applicant: J.A. WOOLLAM CO., INC., Lincoln, NE (US)

(72) Inventors: Ping He, Lincoln, NE (US); Martin M. Liphardt, Lincoln, NE (US); Galen L. Pfeiffer, Roca, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/445,644

(22) Filed: Dec. 8, 2023

Related U.S. Application Data (63) Continuation of application No. 17/300,687, filed on Sep. 30, 2021, now Pat. No. 12,332,163.

(60) Provisional application No. 63/258,750, filed on May 24, 2021.

(51) Int. Cl.
*G01N 21/21* (2006.01)

(52) U.S. Cl.
CPC ..... *G01N 21/211* (2013.01); *G01N 2201/066* (2013.01); *G01N 2201/12746* (2013.01)

(58) Field of Classification Search
CPC ......... G01N 21/211; G01N 2201/0636; G01N 2201/127

See application file for complete search history.

(56) References Cited

U.S. PATENT DOCUMENTS

| | | | | |
|---|---|---|---|---|
| 5,969,818 | A * | 10/1999 | Johs | G01J 3/447 356/369 |
| 6,822,738 | B1 * | 11/2004 | Johs | G01J 4/00 356/369 |
| 7,075,649 | B1 * | 7/2006 | Johs | G01N 21/274 356/369 |
| 8,339,603 | B1 | 12/2012 | Liphardt et al. | |
| 8,436,994 | B2 * | 5/2013 | Liphardt | G01N 21/55 356/399 |
| 9,442,016 | B2 | 9/2016 | Liphardt et al. | |
| 9,500,843 | B1 | 11/2016 | Liphardt et al. | |
| 9,921,395 | B1 | 3/2018 | Liphardt et al. | |
| 10,018,815 | B1 | 7/2018 | Liphardt et al. | |
| 10,101,265 | B1 * | 10/2018 | Schubert | G01N 21/211 |
| 10,338,362 | B1 * | 7/2019 | Liphardt | G02B 27/1006 |
| 10,989,601 | B1 | 4/2021 | Liphardt et al. | |
| 2011/0109906 | A1 * | 5/2011 | Liphardt | G01N 21/55 356/400 |

* cited by examiner

*Primary Examiner* — Roy M Punnoose
(74) *Attorney, Agent, or Firm* — James D. Welch (57) ABSTRACT

Systems for and methodology of calibration, as well as testing of beam directing Ellipsometer systems which utilize polarized electromagnetic radiation to investigate samples.

4 Claims, 7 Drawing Sheets

SYSTEM FOR, AND CALIBRATION AND TESTING OF DIRECTED BEAM ELLIPSOMETER SYSTEMS

This Application is a Continuation of Ser. No. 17/300,687 filed Sep. 30, 2021 and Claims benefit of 63/258,750 Filed May 24, 2021.

TECHNICAL AREA

The present invention relates to ellipsometers systems and procedures, and more particularly to beam directing ellipsometer systems which utilize polarized electromagnetic radiation to investigate samples, and to calibration and testing methodology therefore.

BACKGROUND

Ellipsomter systems which utilize polarized beams of electromagnetic radiation to investigate samples are known. Further known are elements and systems for use in ellipsometers that enable applying collimated or focused beams of electromagnetic radiation to a sample at intended angles of incidence. Most such systems are limited as regards choices in presenting a beam of electromagnetic radiation to a sample. That is, for instance, a beam is collimated or focused and changes in that are typically not without difficulty. It would provide utility were a system available which could be essentially retro-fitted to existing systems, and provide different beam directing systems, which are each sequentially deployable, in an easy to use manner. Particular utility would result if switching between the beam directing systems did not significantly change the polarization state of a beam of electromagnetism presented thereto.

With that insight, it is disclosed that one particularly relevant beam directing system is described in U.S. Pat. No. 8,339,603 to Liphardt et al. Said Patent discloses a Prism which accepts a beam of electromagnetic radiation along, for instance, a "Z" axis and provide an output beam in an "X"–"Y" plane, and the output beam can be at a selected angle of incidence to a sample, effected by rotation of the Prism around the input beam. Further, said beam directing Prism does not change to polarization state (ie. an angle between orthogonal components therein) of the entering beam.

Further, a Patent to Johs et al., U.S. Pat. No. 5,969,818 describes systems for directing (folding) beams of electromagnetic radiation at samples without changing the polarization state thereof. Basically the systems described compensate changes made by some elements, with opposite changes made by others.

For instance, a reflection of a beam on a Source side of a Sample can be compensated by an equivalent but opposite effect on a detector side. Or changes in polarization state effected by two reflections on a source or detector side of a sample, can be compensated for by two equal but opposite changes on the same side of a sample. Said Patent enables providing a collimated beam out when a collimated beam is entered.

Additionally, Patents to Liphardt et al., U.S. Pat. Nos. 9,442,016, 9,500,843, 9,921,395, 10,018,815, 10,338,362 and 10,989,601 describe Beam Focusing Optics which receive a beam of collimated electromagnetic radiation and provide a focused beam out. The systems are similar to those in the 818 Patent, except that in the 818 Patent all reflective elements are generally of similar geometry (eg. planar), whereas in the 016, 843, 815, 362 and 601 Patents there are Convex and Concave elements as well as planar elements present. In the later 601 case compensation is less than total, that is changes induced in a polarized beam of electromagnetic radiation by one element are not canceled by another. However, better control over co-linearity of input and output beams is possible.

The known prior art provides insight to systems and methods for directing polarized electromagnetic beams while preserving attributes such as polarization state of a beam of electromagnetic radiation, but there remains need for a system and methodology for calibrating and testing directed beam ellipsometer systems which provides a plurality if different deam directing systems which is convenient to use and allows easy sequential changing between the different bean directing systems.

All Patents mentioned herein are incorporated by reference into this disclosure.

As alluded to above, even in view of the prior art need remains for a system which could be essentially retro-fitted to existing systems or included in new systems, that provides in a single unit different beam directing systems which are each sequentially deployable, in an easy to use manner, particularly if switching between the beam directing systems did not significantly change the polarization state of a beam of electromagnetism presented to a sample.

DISCLOSURE OF THE INVENTION

The present invention is a system which simultaneously presents a plurality of different electromagnetic beam directing systems in an ellipsometer system, which beam directing systems can be variously sequentially placed into the path of an electromagnetic beam from a source thereof, and deliver said beam to a sample at various angles of incidence, collimated in some cases, and focused in others. Said beam directing ellipsometer system, can be characterized as comprising at least two different sequentially accessible beam directing systems selected from the group consisting of:

two total internal refection beam directing prisms, one before and one after a sample placed on said stage for supporting a sample;

two beam folding optics systems, each comprising four flat mirrors, one before and one after a sample placed on said stage for supporting a sample;

two double prism systems one before and one after a sample placed on said stage for supporting a sample;

two beam focusing optics systems, each comprising two flat and mirrors, a convex mirror and a concave mirror, one before and one after a sample placed on said stage for supporting a sample.

The present invention is also a method of calibrating and testing a directed beam ellipsometer system comprising the steps of:

a) providing a directed beam ellipsometer system comprising:
   a source of electromagnetic radiation;
   a polarizer;
   a stage for supporting a sample;
   an analyzer;
   a detector; and
   when a focused beam is desired focusing and collimating elements before and after said stage, respectively;
   said directed beam ellipsometer system further comprising a plurality of beam directing systems for accepting a beam of electromagnetic radiation from said source thereof, onto which has been imposed a state of polarization, causing said beam of electromagnetic radiation to impinge onto a sample placed on said stage for supporting a sample, reflect therefrom and enter said detector;

each said of beam directing system being characterized in that it provides a combination of attributes to a beam of electromagnetic radiation where it impinges onto said sample, said attributes being selected from the group consisting of:

angles of incidence and reflection;
focused; and
collimated;

said beam directing systems being comprised of elements which do not in total effect, substantially change the polarization state of a beam of electromagnetic radiation interacting therewith.

Said Method Continues with:

b) placing a sample on said stage for supporting a sample;

c) sequentially placing a plurality of said beam directing system into the pathway of said beam of electromagnetic radiation onto which is imposed a polarization state, such that for each beam directing system said beam is caused to reflect from said sample and enter said detector, said detector in response providing a corresponding set of data;

d) simultaneous with, before or after step a), providing separate mathematical models of said directed beam ellipsometer system including each of said plurality of beam directing systems;

e) simultaneously regressing said plurality of mathematical models onto said corresponding plurality of data sets to evaluated parameters in said mathematical models.

An important aspect of the present invention is that different weighting can be applied to different data sets during said simultaneous regression. This can even include providing some data with essentially no weight. For instance, data obtained using a collimated beam can be greatly favored when evaluating Ellipsometer Mathematical Model Parameter evaluation for elements thereof which are common to all beam directing systems.

The method can involve that at least two of said data sets are obtained at different angles of incidence of said beam to said sample, or that at least two of said data sets are obtained for different states of polarized beam focusing or collimation when interacting with said sample and that at least two of said data sets provide different angles of incidence and states of focusing or collimation of said beam when interacting with said sample.

Very importantly, the method can be repeated and mathematical model parameter values determined compared to those determined in the original evaluation procedure, for the purpose of identifying system drift. This is actually a primary purpose behind the present invention. Systems in the field can "drift" with time and it is important to identify changes in equipment which might be mistaken for changes in samples.

A present invention beam directing system can comprise a single element having first and second reflection surfaces; configured to provide a polarized output beam in an "X"–"Z" plane, by redirecting an input beam which enters thereto along a "Y" axis, in an "X" "Y" "Z" axis coordinate system, said first dual reflection surface means further serving to substantially compensate any effects on beam polarization state entered by a first beam directing reflection therewithin, by effects of a second beam directing reflection therewithin, a mechanism thereof being that an effect of the first reflection on a p or s component of a polarized beam in the dual reflection surface means configuration is canceled by a similar effect in the second reflection on an s or p component, respectively;

said first dual reflection surface means being characterized in that projected planes of the first reflection surfaces of the first and second reflection surfaces thereof simultaneously:

intersect the "Y" axis but not the "X" axis at a single point thereof; and intersect the "X" and "Y" axis but not the "Z" axis at a single point thereof;

respectively, and in that the second reflection surface is translated from the first reflection surface along the "Z" axis as said first dual reflection surface is viewed in frontal elevation;

said first dual reflection surface means being mounted to allow rotation about a locus of the input beam to alter an angle at which the output beam exists from the second reflection surface in said "X"–"Z" plane.

Another beam directing system comprises a first element on a source side of said stage and a second element on the detector side, each said being oriented so as to subject a beam of polarized electromagnetic radiation entering thereinto to total internal reflection therein, such that in use a beam of polarized electromagnetic radiation enters the first said element and is directed thereby to impinge upon said sample on said stage at an angle of incidence, reflect therefrom, enter said second element and be directed into said detector thereby; said first and second elements being arranged with respect to one another such that any change in polarization state entered into said polarized beam by said first element is compensated by the second.

Another beam directing system can comprise a first system comprising four elements on a source side of said stage and a second system comprising four elements on the detector side of said stage, each of said first and second systems of four elements being oriented so as to subject a beam of polarized electromagnetic radiation entering thereinto to a series of reflections, each of said first and second systems of four elements being oriented so as to present as two pairs of reflective elements such that in use a polarized beam of electromagnetic radiation is directed onto the first element of said first pair of elements and is reflected therefrom onto the second of said elements in said first pair of elements, from which second element in said first pair of elements said beam of electromagnetic radiation is reflected to the first element of said second pair of elements from which it reflects onto said second element of said second pair and is directed toward said sample on said stage thereby, said four reflective elements being oriented with respect to one another so that a first plane formed by said beam of polarized electromagnetic radiation entering and exiting said first pair or elements is effectively perpendicular to a second plane formed by electromagnetic radiation entering and exiting said second pair; such that in use any change in polarization state entered by said beam reflecting from the first and second reflective elements of said first pair of element is compensated by reflections from the first and second reflective elements of said second pair. In the just described beam directing system all reflective elements of both pairs thereof can be flat mirrors, and a collimated beam of electromagnetic radiation entered to the first reflective mirror of said first pair exists the second reflective element of said second pair as a collimated polarized beam of electromagnetic radiation. Alternatively the first and second reflective elements of the first pair thereof are flat mirrors, and wherein the first and second reflective elements of said second pair thereof are, respectively, convex and concave such that a collimated beam of polarized electromagnetic radiation entering the first reflective element of the first pair of reflective elements exist the second reflective element if the second pair thereof as focused.

Another beam directing system can comprise a first system comprising four elements on a source side of said stage and a second system comprising four elements on the detector side of said stage, each of said first and second systems of four elements being oriented so as to subject a beam of polarized electromagnetic radiation entering thereinto to a series of reflections, each of said first and second systems of four elements being oriented so as to present as two pairs of reflective elements such that in use a polarized beam of electromagnetic radiation is directed onto the first element of said first pair of elements and is reflected therefrom onto the second of said elements in said first pair of elements, from which second element in said first pair of elements said beam of electromagnetic radiation is reflected to the first element of said second pair of elements from which it reflects onto said second element of said second pair and is directed toward said sample on said stage thereby, said first and second reflective elements of the first pair thereof are flat mirrors, and wherein the first and second reflective elements of said second pair thereof are, respectively, convex and concave such that a collimated beam of polarized electromagnetic radiation entering the first reflective element of the first pair of reflective elements exist the second reflective element if the second pair thereof as focused; said four reflective elements being oriented with respect to one another so that a first plane formed by said beam of polarized electromagnetic radiation entering and exiting said first pair or elements is other than perpendicular to a second plane formed by electromagnetic radiation entering and exiting said second pair of reflective element.

Step c) can further comprise data being obtained with the directed beam ellipsometer system configured straight-through, such that the source of electromagnetic radiation provides a beam of electromagnetic radiation and directs it to pass through said polarizer, analyzer and enter said detector, and step d) further comprises including said data set and a mathematical model for the beam directing ellipsometer system in said straight-through configuration.

A present invention directed beam ellipsometer system can be beneficially descried as comprising at least two selections from the group consisting of:
 a source of electromagnetic radiation, a polarizer a first beam directing element, a stage for supporting a sample, a second beam directing element; an analyzer and a detector;
 a source of electromagnetic radiation, a polarizer; an alternative first beam directing element; stage for supporting a sample; an alternative second beam directing element, an analyzer and a detector;
 a source of electromagnetic radiation, a polarizer a first beam directing element, a focusing element, a stage for supporting a sample, a collimating element, a second beam directing element; an analyzer and a detector;
 a source of electromagnetic radiation, a polarizer an alternative first beam directing element, a focusing element, a stage for supporting a sample, a collimating element, an alternative second beam directing element; an analyzer and a detector;
 a source of electromagnetic radiation, a polarizer, a first beam directing system including reflective focusing, a stage for supporting a sample, a second beam directing system including reflective collimation; an analyzer and a detector; and
 a source of electromagnetic radiation, a polarizer, an alternative first beam directing system including reflective focusing, a stage for supporting a sample, a second alternative beam directing system including reflective collimation; an analyzer and a detector.

A present invention method of calibrating and testing a directed beam ellipsometer then comprise providing such a system as just described in a step a), followed by
 b) causing said source of electromagnetic radiation to direct an effectively collimated beam of electromagnetic radiation so that it interacts with said at least two of said selections, sequentially, and enters the associated detector which provides a data set;
 c) simultaneous with, or before or after step a) providing a mathematical models of said at least two selections and doing a simultaneous mathematical regression of said at last two mathematical models onto corresponding data sets produced in step b), to the end that parameters in said mathematical model for at least said polarizer and analyzer are evaluated and fixed.

Said method can involve different data sets are given different weights in said step c) simultaneous regression.

Said method can further comprises repeating steps a)-c) a second time, followed by comparing mathematical model parameter values and noting any drift compared to the values obtained in the original procedure.

Said method can provide that the first and second beam directing systems and the alternate first and second beam directing systems are selected from the group consisting of:
 first and second separate reflection surfaces which are orthogonal to one another; and
 a single element having first and second reflection surfaces; configured to provide a polarized output beam in an "X"–"Z" plane, by redirecting an input beam which enters thereto along a "Y" axis, in an "X" "Y" "Z" axis coordinate system, said first dual reflection surface means further serving to substantial compensate any effects on beam polarization state entered by a first beam directing reflection therewithin, by effects of a second beam directing reflection therewithin, a mechanism thereof being that an effect of the first reflection on a p or s component of a polarized beam in the dual reflection surface means configuration is canceled by a similar effect in the second reflection on an s or p component, respectively;
 said first dual reflection surface means being characterized in that projected planes of the first reflection surfaces of the first and second reflection surfaces thereof simultaneously:
  intersect the "Y" axis but not the "X" axis at a single point thereof; and
  intersect the "X" and "Y" axis but not the "Z" axis at a single point thereof;
 respectively, and in that the second reflection surface is translated from the first reflection surface along the "Z" axis as said first dual reflection surface is viewed in frontal elevation;
 said first dual reflection surface means being mounted to allow rotation about a locus of the input beam to alter an angle at which the output beam exists from the second reflection surface in said "X"–"Z" plane.

Said method can provide that the first and second reflective element beam directing systems each comprise four elements, each of said first and second reflective element beam directing systems four elements being oriented so as to subject a beam of polarized electromagnetic radiation entering thereinto to a series of reflections, said four elements being oriented so as to present as two pairs of reflective elements such that in use a polarized beam of electromagnetic radiation is directed onto the first element of said first pair of elements and is reflected therefrom onto the second of said elements in said first pair of elements, from which second element in said first pair of elements said beam of electromagnetic radiation is reflected to the first element of said second pair of elements from which it reflects onto said second element of said second pair and is directed toward said sample on said stage thereby, said four reflective elements being oriented with respect to one another so that a first plane formed by said beam of polarized electromagnetic radiation entering and exiting said first pair or elements is effectively perpendicular to a second plane formed by electromagnetic radiation entering and exiting said second pair; such that in use any change in polarization state entered by said beam reflecting from the first and second reflective elements of said first pair of element is compensated by reflections from the first and second reflective elements of said second pair.

The present invention will be better understood by reference to the Detailed Description Section of this Specification, in combination with the Drawings.

BRIEF DESCRIPTION OF THE DRAWINGS

FIGS. 7a-7f are adapted for Patents to Liphardt et al. U.S. Pat. Nos. 9,442,016; 9,500,843; 9,921,395; 10,018,815, 10,338,362 and 10,989,601 and show another Beam Directing System that is of value to the present invention referred to as Beam Focusing Optics.

FIGS. 8a-9c are included to cover a preferred embodiment of the Invention.

DETAILED DESCRIPTION

Figure 1:
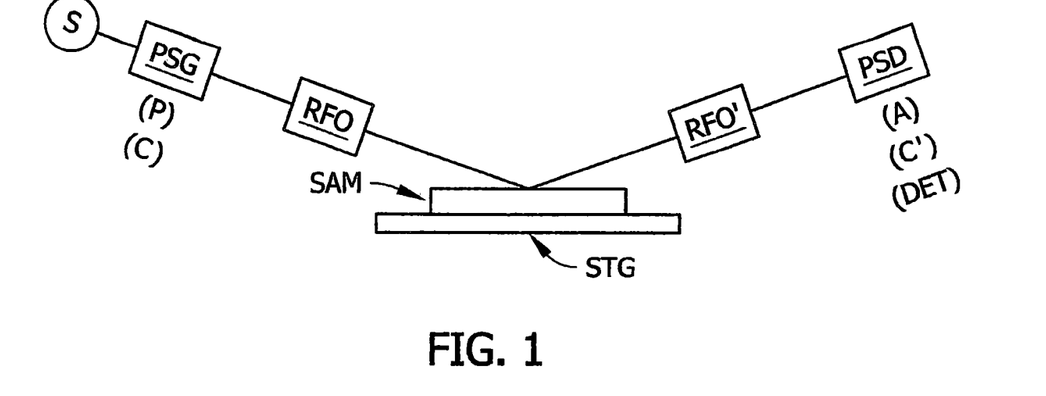
FIG. 1 shows a general Beam Directing Ellipsometer configuration and is adapted from U.S. Pat. No. 10,989,601 to Liphardt et al.

Turning now to the Drawings, FIG. 1 shows a general Beam Directing Ellipsometer configuration and is adapted from U.S. Pat. No. 10,989,601 to Liphardt et al. Shown are a Source of electromagnetic radiation (S), a Polarization State Generator (PSG), a First Reflective Optics (RFO) system, a Stage (STG) for supporting a Sample (S), a Second Reflective Optics System (RFO') and a Polarization State Detector (PSD). It is to be understood that a Polarization State Generator (PSG) can comprise a Polarizer (P) and Compensator (C) for polarizing a beam of electromagnetic radiation passed therethrough. And a Polarization State Detector can include an Analyzer (A), Compensator (C') and Detector a (DET) per se. Of particular interest in the present invention are the various embodiments of the First and Second Reflective Optics (RFO) and (RFO') respectively.

A necessary aspect of any ellipsomter system involves beam directing means for providing a polarized beam of electromagnetic radiation to a sample at an angle-of-incidence and in a polarization state, said sequence preferably having negligible effect on the end results of conducting an investigation of a sample. The present invention considers that four such beam directing means are of particular relevance, namely those that involve:

Total Internal Reflection Prisms;
Beam Folding Optics;
Double Prisms; and
Beam Focusing Optics.

In the following examples of said particularly relevant systems are provided.

Total Internal Reflection Prisms

Figure 2:
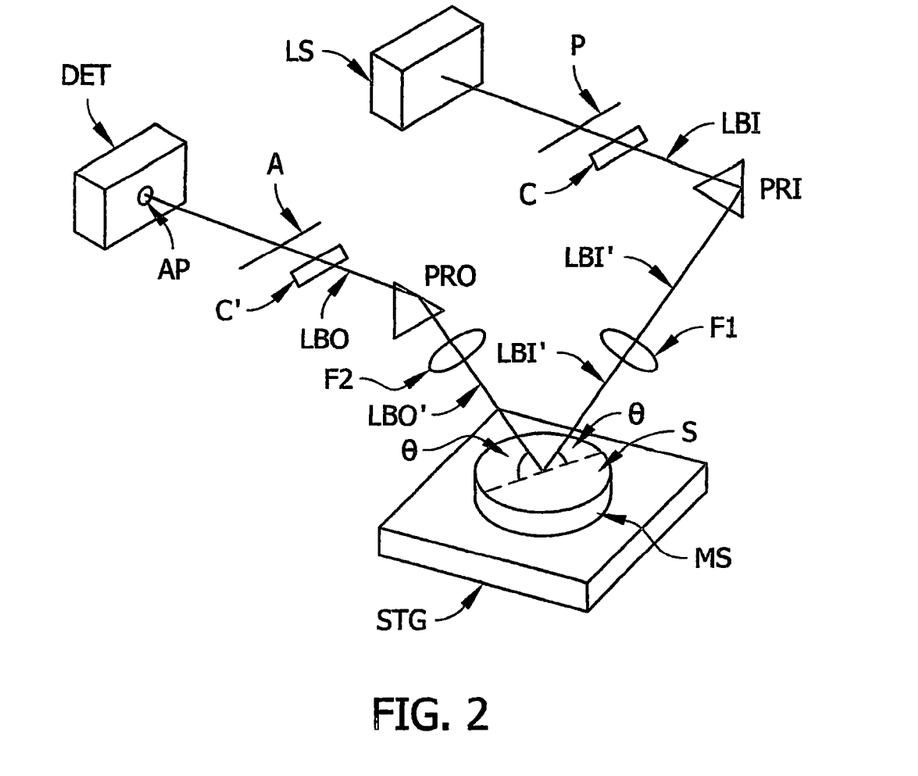
FIG. 2 shows another rendition of a Beam Directing Ellipsometer adapted from U.S. Pat. No. 5,969,818 to Johs et al. including Prism beam directing elements that provide total internal reflection.

FIG. 2 shows another rendition of a Beam Directing Ellipsometer adapted from U.S. Pat. No. 5,969,818 to Johs et al. Shown are a source of electromagnetic radiation (LS), which provides a beam (LBI) thereof directed to pass through a Polarizer (P) and optional Compensator (C) before totally internally reflecting from a surface in a Prism (PRI) which directs said beam (as LBO') toward a Sample (MS) placed in a Stage (STG) for supporting said Sample (MS) at an Angle-if-Incidence (θ) to a Surface (S) thereof. Note that a refractive Focusing Element (F1) is also demonstrated to make the FIG. 2 embodiment of the Beam Directing Ellipsometer a Focused Beam System. After reflecting from said Sample (MS) Surface (S) at an Angle-of Reflection (θ), the beam (LBO') is shown passing through a second refractive Focusing Element (F2) (which acts as a Beam Collimator), then encountering a second totally internally reflecting from a surface in a Prism (PRO), which directs said beam (as LBO) through an Analyzer (A) and into said Detector (DET). Note that the Polarization State Generator (PSG) in the alternative embodiment of FIG. 1, is represented as the Polarizer (P) and Compensator (C) in FIG. 2, as is the combination of Analyzer (A), Compensator (C') and Detector (DET) in FIG. 2, represented as the Polarization State Detector (PSD) in FIG. 1.

As regards the present invention an important aspect is found in the Beam Directing Elements (PRI) and (PRO). Said Elements are Totally Internally Reflecting, hence a beam entering into (PRI) and exiting from (PR2) as shown in FIG. 2, occurs without significantly altering a Polarization state (ie. the Phase Angle between "p" and "s" components characterizing a beam) of said electromagnetic beam. In the FIG. 2 embodiment, when the total internal reflection effecting surfaces from which a polarized beam of electromagnetic radiation reflects in (PRI) and (PRO), any change in Phase Angle between "p" and "s" components characterizing a beam which occurs in (PRI) is compensated by (PRO) when said total internal reflection effecting surfaces are oriented orthogonal to one another.

Beam Folding Optics

Figure 3:
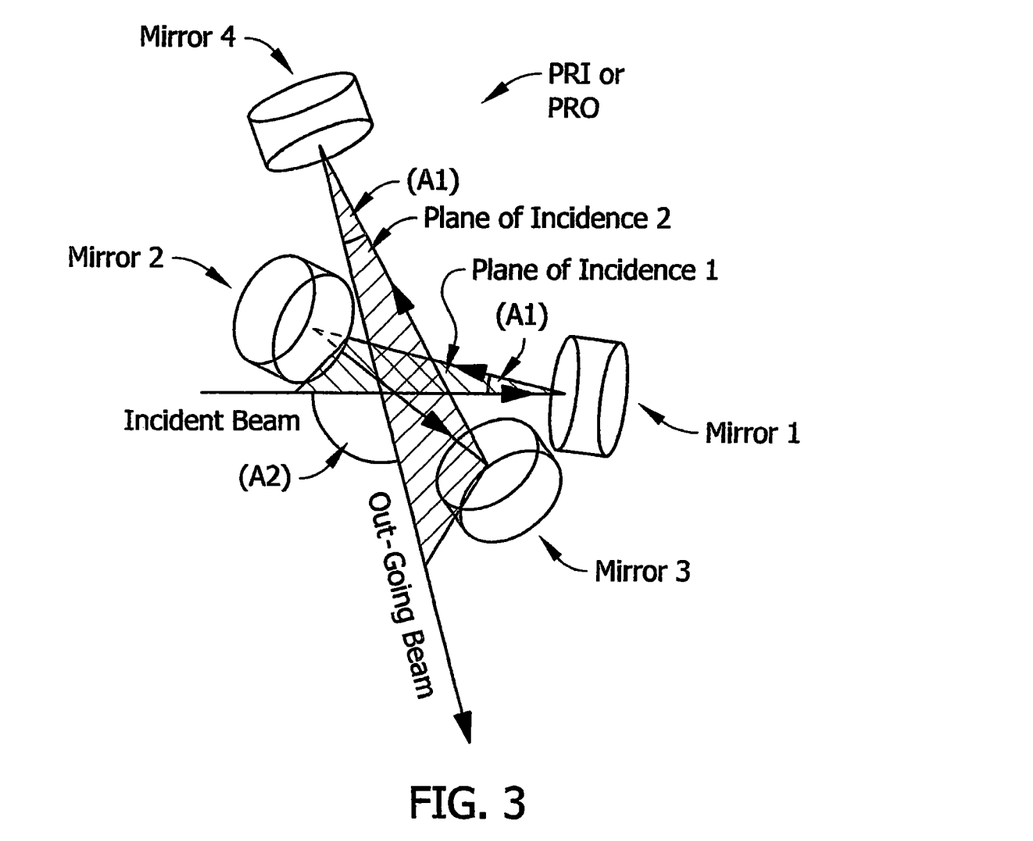
FIG. 3 shows an alternative design for the Prisms (PRI) and (PRO) in FIG. 2, which alternative design provides that each of (PRI) and (PRO) self-compensates.

As also adapted from U.S. Pat. No. 5,969,818 to Johs et al., FIG. 3 shows an alternative design for the Prisms (PRI) and (PRO) in FIG. 2, which alternative design provides that each of (PRI) and (PRO) self-compensates. That is, the Polarization State (ie. the Phase Angle between "p" and "s" components characterizing a beam) of the Beam (LB1) is not altered by interaction with the Mirrors 1, 2, 3 and 4 of (the FIG. 3 (PRI) or (PRO). Note that in FIG. 3 an Incident Beam reflects from Mirror 1 and proceeds toward Mirror 2 thereby defining a Plane-of-Incidence (1). Mirror 2 reflects the Beam it receives toward Mirror 3 which in turn reflects the Beam it receives toward Mirror 4, thereby defining Plane-of-Incidence 2. Of primary importance is that, in each of (PRI) and (PRO) said Plane-of-Incidence (1) and said Plane-of-Incidence (2) are orthogonal to one another. Thus any change in Polarization State induced by interaction with Mirrors 1 and 2, is offset by interaction with Mirrors 3 and 4.

Double Prism.

Figure 4:
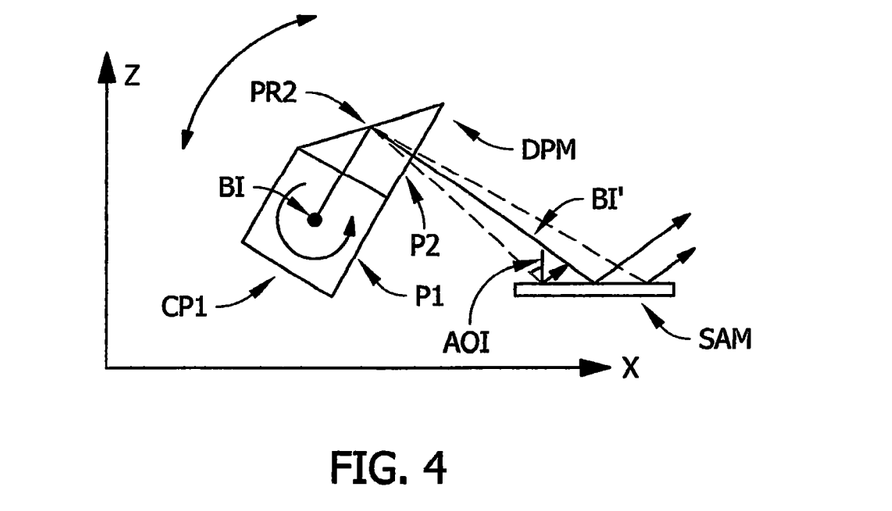
FIG. 4, is adapted from U.S. Pat. No. 8,339,603 to Liphardt et al., and shows another Beam Directing System (DPM in an application setting which is relevant to the present invention.
Figure 5:
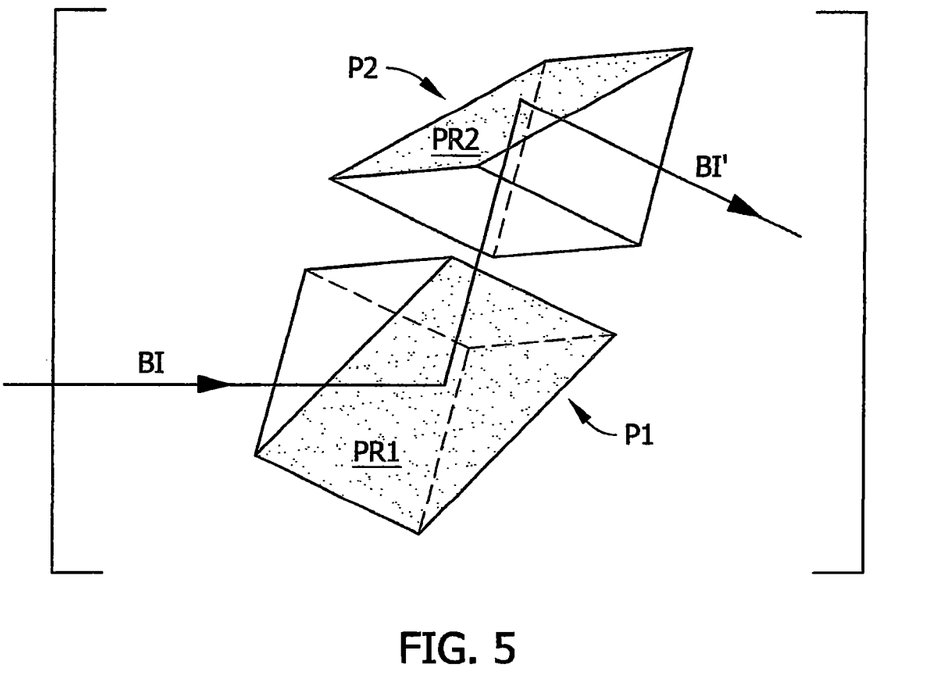
FIG. 5 shows a two Prism ((P1) and (P2)) construction identifying said orthogonal Planes (PRI) and (PR2).
Figure 6:
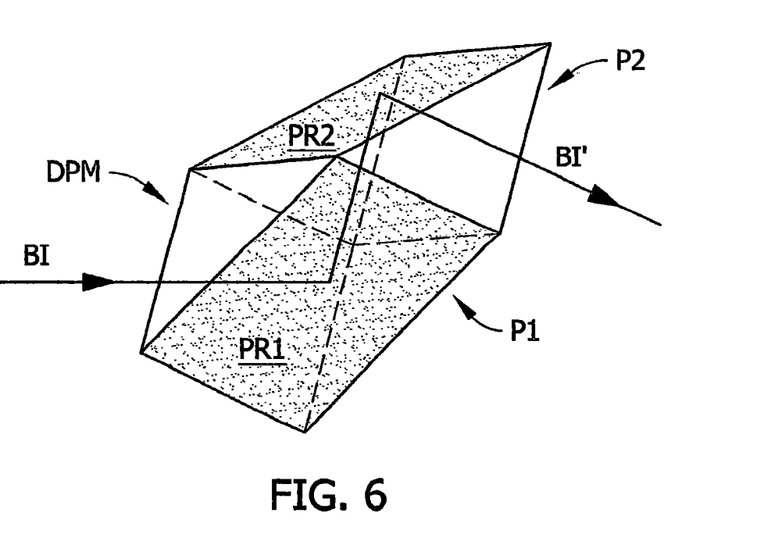
FIG. 6 shows an Integrated construction of the beam directing system of FIG. 5.

FIG. 4, adapted from U.S. Pat. No. 8,339,603 to Liphardt et al., shows another Beam Directing System (DPM) in an application setting which is relevant to the present invention. Note that a beam of electromagnetic radiation (BI) enters (DPM) along what is identifiable as, as shown, a "Y" axis, and exits as Beam (BI') in a "Z"–"Y" Plane, which is directed toward a Sample (SAM) at an Angle-of-Incidence (AOI) thereto. It should be appreciated that the Angle-of-Incidence (AOI) of said Beam (BI') can be very easily adjusted by rotation of Dual Prism (DPM) around the locus of said Input Beam (BO). Said ease of adjustment of the (AOI) is of benefit in the present invention. As for the System of FIG. 2, the FIG. 4 system does not enter change to a Polarization state of said Input Beam (BI). This again results from a self-compensating effect of orthogonal planes (P1) and (P2). FIG. 5 shows a two Prism ((P1) and (P2)) construction identifying said orthogonal Planes (PRI) and (PR2). FIG. 6 shows an Integrated construction. FIG. 5 is helpful in forming an analogy to FIG. 2, however. In use the FIG. 6 integrated Dual Prism (DPM) is more convenient. (For insight, the FIG. 2 surface from which the electromagnetic beam (LB1) totally internally reflects is in an orthogonal relationship to the surface from which the electromagnetic beam (LBO') totally internally reflect as are Planes (PR1) and (PR2) in FIGS. 5 and 6).

It should be appreciated that the Beam Directing Systems of FIGS. 2-6 do not themselves focus a beam entering therein onto a sample. Therefore, as shown in FIG. 2, if a focused beam is desired at a sample surface, additional elements (eg. (F1) and (F2)) are required and said additional element can enter uncompensated changes to polarization state which must be accounted for in a regression procedure. It is noted that as said additional elements (F1) and (F2) do enter Polarization state changes, it would be of benefit if a system such a that in FIG. 3 existed, and could provide a focused beam to a sample.

It is to be appreciated that Total Internal Reflection Prisms, Beam Folding Optics and Double Prisms can be described as "Beam Directing Elements" that, when required, are combined with focusing and collimating elements to provide small spot focused beams at a Sample Surface.

Beam Focusing Optics

A system similar to the FIG. 3 system which provides a focused beam to a sample is shown in FIGS. 7a-7F, but without the need for separate focusing and collimating elements. Said Beam Directing System is of value to the present invention and is referred to as a "Beam Focusing Optics". Said FIGS. 7a-7F are adapted from Patents to Liphardt et al. U.S. Pat. Nos. 9,442,016; 9,500,843; 9,921, 395; 10, 018, 815, 10, 338, 362 and 10,989,601.

Figure 7A:
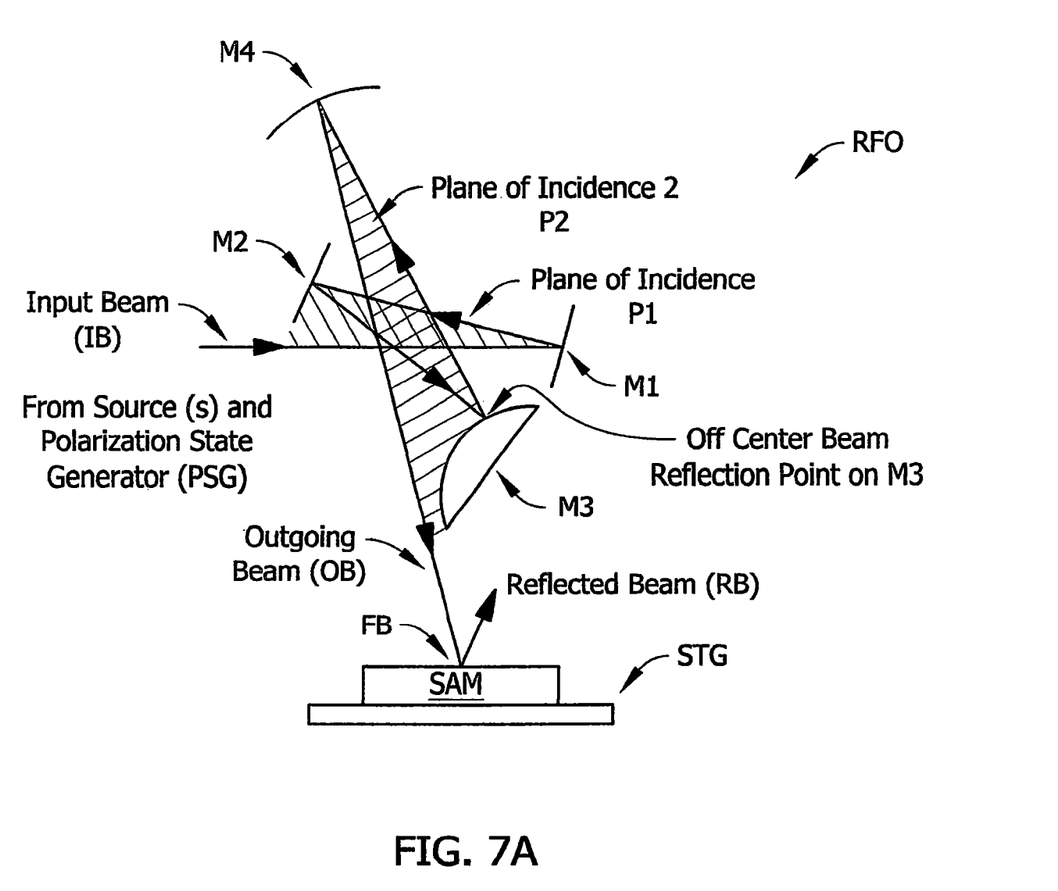
Figure 7B:
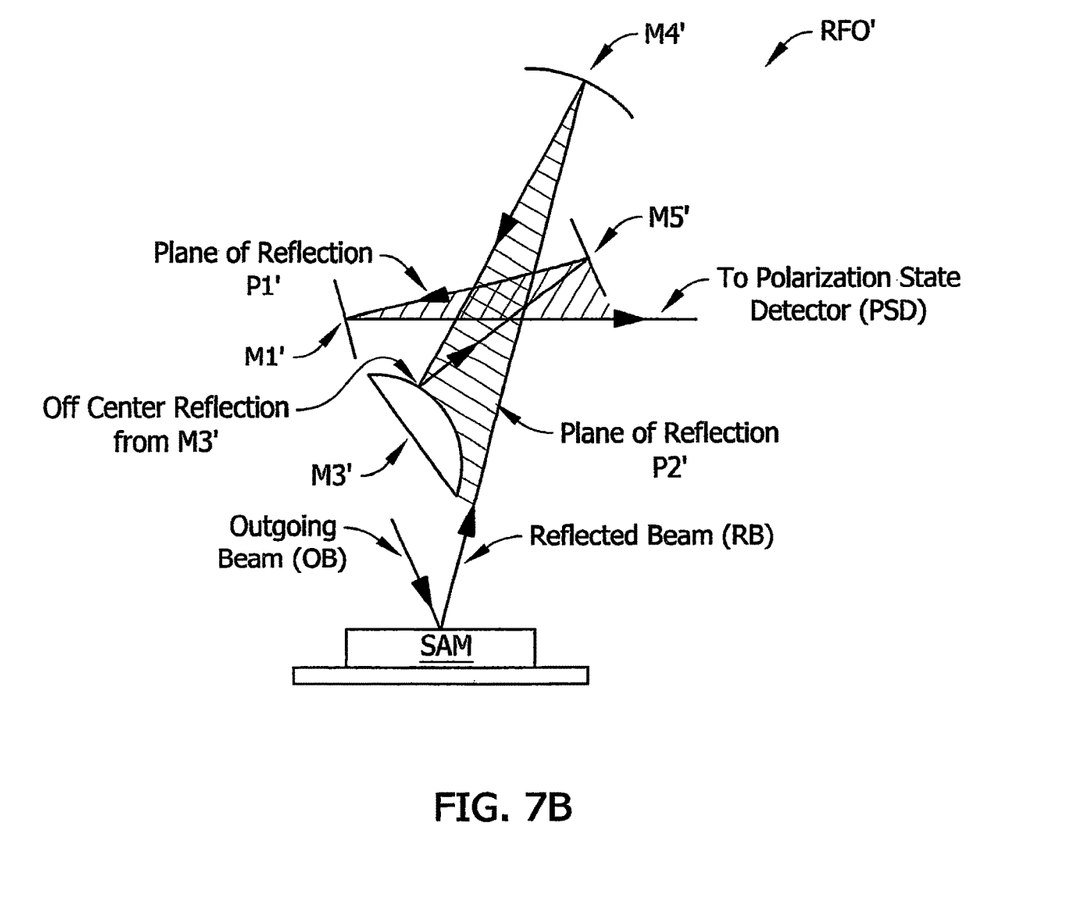

FIGS. 7A and 7B show before and after Sample (SAM) versions thereof, respectively. Note that as in FIG. 3, an input beam (IB) reflects from a First Mirror (Mirror 1), onto a second Mirror (Mirror2) thereby forming a First Plane (P1). Note both Mirrors (M1) and M2) in FIG. 7A are Flat Mirrors, as in the FIG. 3 Beam Directing System Mirror 1 and Mirror 2. However, note that in the pre-sample system of FIG. 7A Mirrors (M3) and (M4) are not flat, but rather are Convex and Concave respectively, rather than Flat as the similarly positioned mirrors in FIG. 3. Thus in FIG. 7A, a Beam exiting Mirror (M4) toward Sample (SAM), is Focused. Note the similarity between Mirrors functionally positioned in FIGS. 3 and 7A. If FIG. 7A can be considered a Beam Directing System positioned as a (PRI) in FIG. 2, then FIG. 7B and be considered a Beam Directing System positioned as a (PRO) in FIG. 2.

Figure 7E:
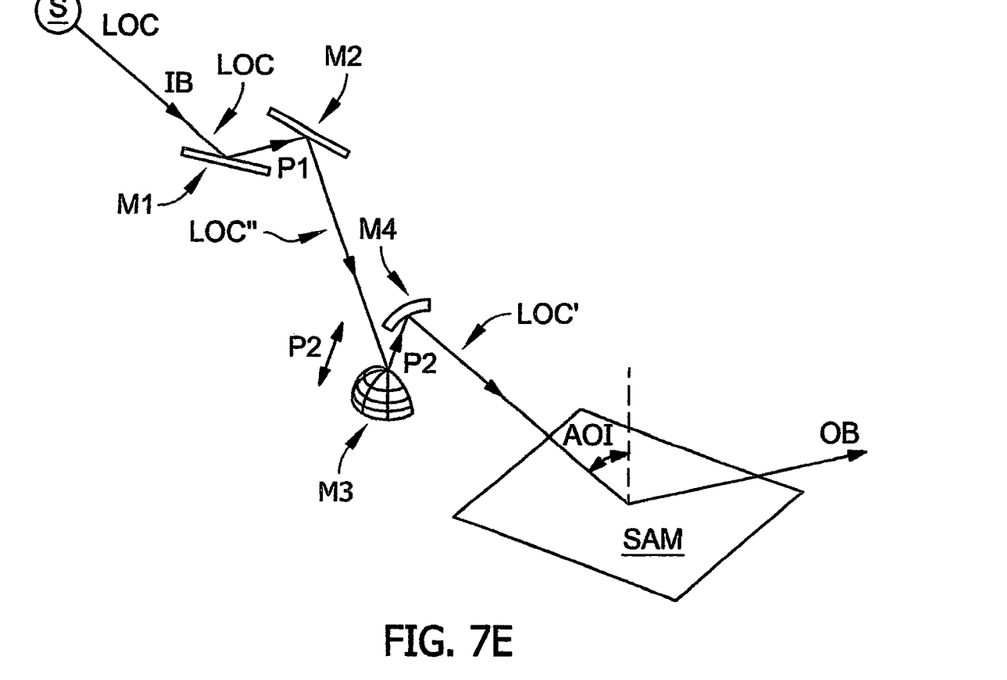
Figure 7F:
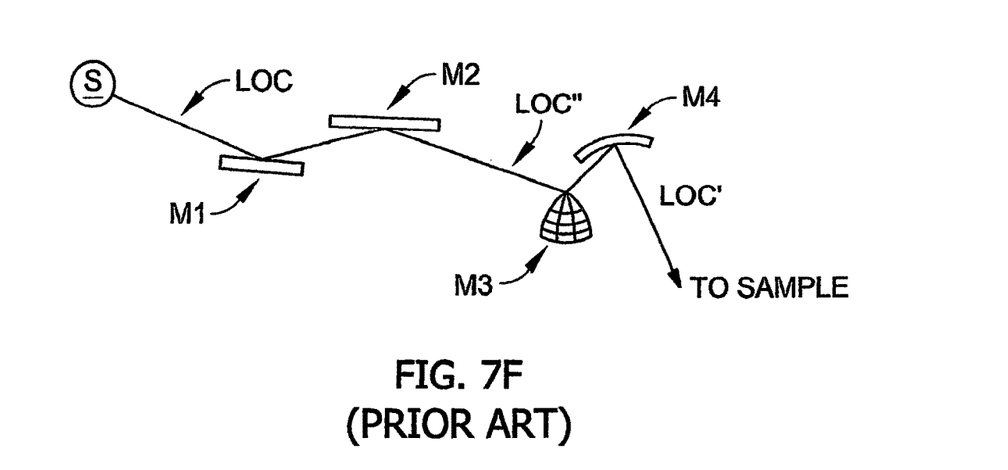

The Beam Focusing Optics of FIGS. 7A-7F are beneficial, but present a problem which must be appreciated. FIGS. 7C and 7D demonstrate the problem. FIG. 7C shows that when Planes (P1) and (P2) are orthogonal in FIG. 7A an initial Angle-of-Incidence (AOI) (ie. $\theta 1$) from a Source (FIG. 7A "S") is not preserved when passing through a FIG. 7A Beam Focusing Optics System. Instead FIG. 7A shows that an effective (AOI) (ie. $\theta 2$). FIG. 7D demonstrates that if the Planes (P1) and (P2) are allowed to deviate from the orthogonal condition, then ($\theta 1$) and ($\theta 2$) can be brought closer to one another, but with the accompanying problem that the FIGS. 7A (and 7B) system will introduce some change in Polarization State into a Polarized Beam input thereto. FIGS. 7E and 7F better demonstrate the situation. FIG. 7E shows that when Planes (P1) and (P2) in FIG. 7B are orthogonal then an (AOI) change must be taken inti account, FIG. 7A shows that if Planes (P1) and (P2) are allowed to deviate from an orthogonal relationship therebetween, then the (AOI) problem can be reduced.

Figure 8A:
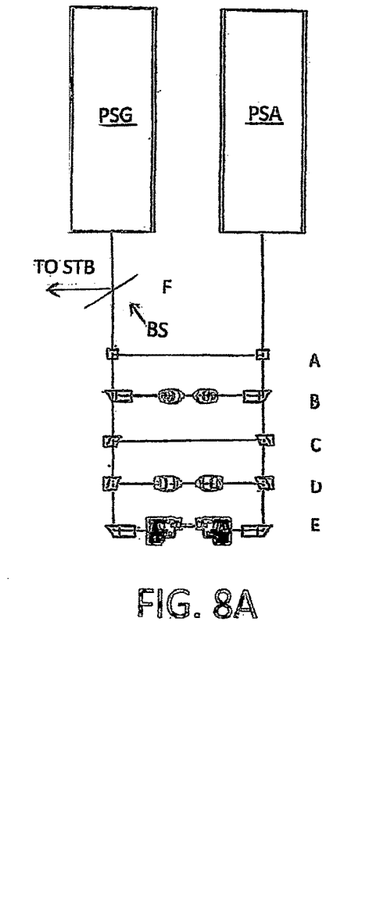
Figure 8B:
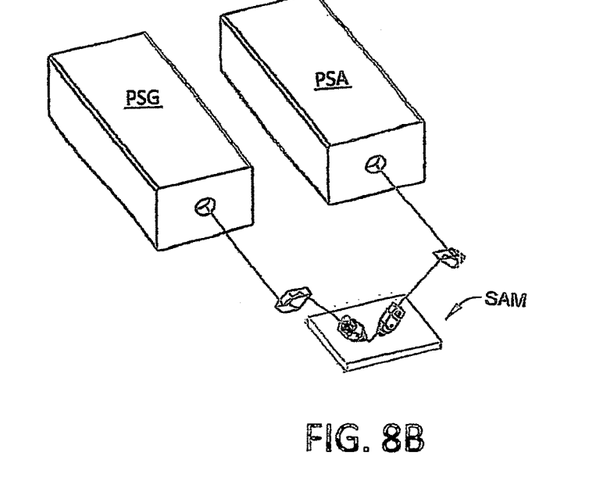
Figure 8C:
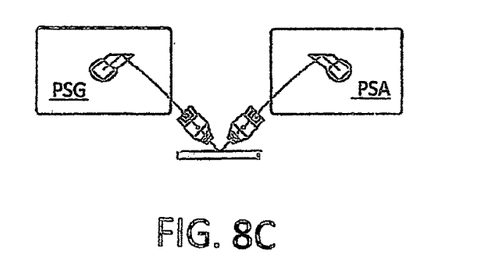

FIGS. 8A-8C are included as they show a preferred, compact, Beam Directing System. FIG. 8A in particular shows a Top view of a system comprising a plurality of beam directing elements (A-E), some for providing an angle-of-incidence to a sample (SAM) of 45 degrees and some at 65 degrees, for instance. Both refractive and reflected beam directing elements are possible as are collimating and non-collimating elements. While most beam directing elements provide a beam at an angle of incidence to a sample the system further comprises a straight through configuration (A) wherein said beam does not interact with a sample. It is to be appreciated that while FIG. 8A shows a plurality of Beam Directing and modifying system pathways (identified as A-E) only one thereof is typically in use at a time. That is, receipt of a Beam thereby prevents further transmission thereof. To enable this, each such system is mounted so as to be easily translated. For instance, If Beam Directing and modifying system "E" is to be utilized, systems identified as A-D will be translated to the left or right out of the path of the electromagnetic beam entered by the Polarization State Generator (PSG), and that received by the Polarization State Analyzer (PSA). While translation is preferred, any approach to removing a beam directing system from the path of the electromagnetic beams can be used. Typically multiple such Beam Directing Systems (selected from systems at B-E) will be applied and a corresponding number of Data Sets acquired, said Data Sets then being simultaneously regressed upon in Models of the Bedam Directing Systems in the Method of the Present Invention. Note also in FIG. 8A that a Beam Splitter (BS) is shown at location "F". This is to show that a portion of an electromagnetic beam provided by the Polarization State Generator (PSG) can be directed to a Beam Stabilization (STB) circuit.

In view of the foregoing the present invention can then be beneficially considered to comprise, in a single unit (eg. FIG. 8A), a plurality of systems for directing electromagnetic beams at samples at various angles-of-incidence to a sample (SAM) surface which are variously focusing or collimated, with preservation of selected parameters, primarily the Polarization State of a beam of electromagnetic radiation entered into a Beam Directing and Modifying System.

It is also mentioned that a less compact version of a present invention, functionally similar to that in FIG. 8A, can be fashioned after FIG. 1. That is, where a FIG. 4 type Prism is not utilized to direct a beam 90 Degrees ono a Sample (SAM) as in FIGS. 8A-8c, beam directing systems as in FIGS. 7A and 7B can be applied. The important factor in any embodiment is that the Beam Directing System involved does not alter the Polarization state of a Beam of electromagnetic radiation interacting therewith.

A beam directing ellipsometer system can therefore be described as comprising:
- a source of electromagnetic radiation;
  - a polarizer;
  - a stage for supporting a sample;
  - an analyzer;
  - a detector; and
  - when a focused beam is desired focusing and collimating elements before and after said stage, respectively;
- said directed beam ellipsometer system further comprising a plurality of beam directing systems for accepting a beam of electromagnetic radiation from said source thereof, onto which has been imposed a state of polarization, causing said beam of electromagnetic radiation to impinge onto a sample placed on said stage for supporting a sample, reflect therefrom and enter said detector;
- each said of beam directing system being characterized in that it provides a combination of attributes to a beam of electromagnetic radiation where it impinges onto said sample, said attributes being selected from the group consisting of:
  - angles of incidence and reflection;
  - focused; and
  - collimated.

Importantly, said beam directing ellipsometer system as just described, can be characterized as comprising at least two different sequentially accessible beam directing systems selected from the group consisting of:
- two total internal refection beam directing prisms, one before and one after a sample placed on said stage for supporting a sample;
- two beam folding optics systems, each comprising four flat mirrors, one before and one after a sample placed on said stage for supporting a sample;
- two double prism systems one before and one after a sample placed on said stage for supporting a sample;
- two beam focusing optics systems, each comprising two flat and mirrors, a convex mirror and a concave mirror, one before and one after a sample placed on said stage for supporting a sample.

It should be appreciated that a single unit that provides a plurality of element sequences that are easily sequentially accessible, said element sequences comprising at least two different selections from the group consisting of:
- two total internal refection beam directing prisms, one before and one after a sample placed on said stage for supporting a sample;
- two beam folding optics systems, each comprising four flat mirrors, one before and one after a sample placed on said stage for supporting a sample;
- two double prism systems one before and one after a sample placed on said stage for supporting a sample;
- two beam focusing optics systems, each comprising two flat and mirrors, a convex mirror and a concave mirror, one before and one after a sample placed on said stage for supporting a sample;

which multiple element sequences can be applied in essentially any Ellipsometer to provide a beam directing Ellipsometer system, system provides utility in the form of slowing different beam directing systems to be easily sequentially changed.

As alluded to in the Background Section of this Disclosure, U.S. Pat. No. 5,969,818 to Johs et al.; U.S. Pat. Nos. 8,339,603 9,442,016; 9,500,843; 9,921,395; 10,018,815, 10,338,362 and 10,989,601 to Liphardt et al. are incorporated by reference hereinto.

Having hereby disclosed the subject matter of the present invention, it should be obvious that many modifications, substitutions and variations of the present invention are possible in view of the teachings. It is therefore to be understood that the invention may be practiced other than as specifically described, and should be limited only in its breadth and scope only by the Claims.

We claim:

1. An ellipsometer system comprising a source of a beam of electromagnetic radiation, a polarization state generator, a stage for supporting a sample, a polarization state analyzer and a detector of electromagnetic radiation;
   said ellipsometer system further comprising a beam directing system selected from a group consisting of:
   a) two total internal reflection beam directing prisms, one before and one after a sample placed on said stage for supporting a sample;
   b) two beam folding optics systems, each comprising four flat mirrors, one before and one after a sample placed on said stage for supporting a sample;
   c) two double prism systems one before and one after a sample placed on said stage for supporting a sample;
   d) two beam focusing optics systems, each comprising two flat and mirrors, a convex mirror and a concave mirror, one before and one after a sample placed on said stage for supporting a sample;
   such that in use a beam of electromagnetic radiation provided by said source thereof passes through said a polarization state generator, said polarization state analyzer and enters said detector of electromagnetic radiation, said beam further interacting with a sample placed on said stage for supporting a sample, and said selected beam directing system, both before and after said sample.

2. A beam directing ellipsometer system as in claim 1, in which selections result in a system comprised of elements that provide:
   a refractively focused beam at a 45 degree angle of incidence to a sample placed on said stage;
   a refractively focused beam at a 65 degree angle of incidence to a sample placed on said stage;
   a collimated beam at a 45 degree angle of incidence to sample placed on said stage; and
   a collimated reflectively focused beam at a 65 degree angle of incidence to sample placed on said stage
   further comprises a straight through configuration wherein said beam does not interact with a sample.

3. A method of directing a beam of electromagnetic radiation comprising the steps of:

a) providing an ellipsometer system comprising a source of electromagnetic radiation, a polarization state generator, a stage for supporting a sample, a polarization state analyzer and a detector of electromagnetic radiation;

said ellipsometer system further comprising a beam directing system selected from a group consisting of:

a') two total internal reflection beam directing prisms, one before and one after a sample placed on said stage for supporting a sample;

b') two beam folding optics systems, each comprising four flat mirrors, one before and one after a sample placed on said stage for supporting a sample;

c') two double prism systems one before and one after a sample placed on said stage for supporting a sample;

d') two beam focusing optics systems, each comprising two flat and mirrors, a convex mirror and a concave mirror, one before and one after a sample placed on said stage for supporting a sample;

that such in use each independently selected beam directing system can be sequentially positioned to receive and pass therethrough, both before and after said stage for supporting a sample, said beam of electromagnetic radiation;

b) placing a sample on said stage for supporting a sample;

c) causing said source of a beam of electromagnetic radiation, to direct a beam of electromagnetic radiation so it passes through said a polarization state generator, interacts with said sample placed on said stage for supporting a sample, then passes through a polarization state analyzer, said beam also interacting with said beam directing system comprising a selection from a', b', c' and d', both before and after said sample, said beam then entering said detector of electromagnetic radiation which provides data pertaining to sample.

4. A method as in claim 3, which further comprises repeating step c) at least once with a different beam directing system selected from a', b', c' and d'.

\* \* \* \* \*